United States Patent [19]

Mizuno et al.

[11] Patent Number: 4,472,775

[45] Date of Patent: Sep. 18, 1984

[54] DISPLAY METHOD AND SYSTEM

[75] Inventors: Tooru Mizuno, Nagoya; Yutaka Imai, Toyota, both of Japan

[73] Assignees: Nippondenso Co., Ltd., Kariya; Toyota Jidosha Kogyo Kabushiki Kaisha, Toyota, both of Japan

[21] Appl. No.: 322,296

[22] Filed: Nov. 17, 1981

[30] Foreign Application Priority Data

Nov. 20, 1980 [JP] Japan .................. 55-164366

[51] Int. Cl.³ ............................................. G01P 3/56
[52] U.S. Cl. .................................. 364/424; 364/565; 340/936; 324/161
[58] Field of Search ............... 364/424, 426, 565; 324/160, 161, 166; 340/27 NA, 62, 753, 754; 73/488, 2; 377/39

[56] References Cited

U.S. PATENT DOCUMENTS

| | | | |
|---|---|---|---|
| 3,855,572 | 12/1974 | Olson | 340/753 |
| 4,151,466 | 4/1979 | Boyer et al. | 324/160 |
| 4,243,938 | 1/1981 | Bliven et al. | 324/161 |
| 4,368,426 | 1/1983 | Hayashi et al. | 324/161 |
| 4,368,427 | 1/1983 | Hayashi et al. | 364/565 |

*Primary Examiner*—Gary Chin
*Attorney, Agent, or Firm*—Cushman, Darby & Cushman

[57] ABSTRACT

In a bar-graph type display method and system for automotive vehicle for monitoring an engine speed of the automotive vehicle and displaying the result of monitoring stepwise, when an indication level adjacent to the present indication level is detected a predetermined number of times successively, the present indication level is changed to the adjacent indication level, and when an indication level other than the present or adjacent indication level is detected the present indication level is changed to the detected indication level immediately.

5 Claims, 4 Drawing Figures

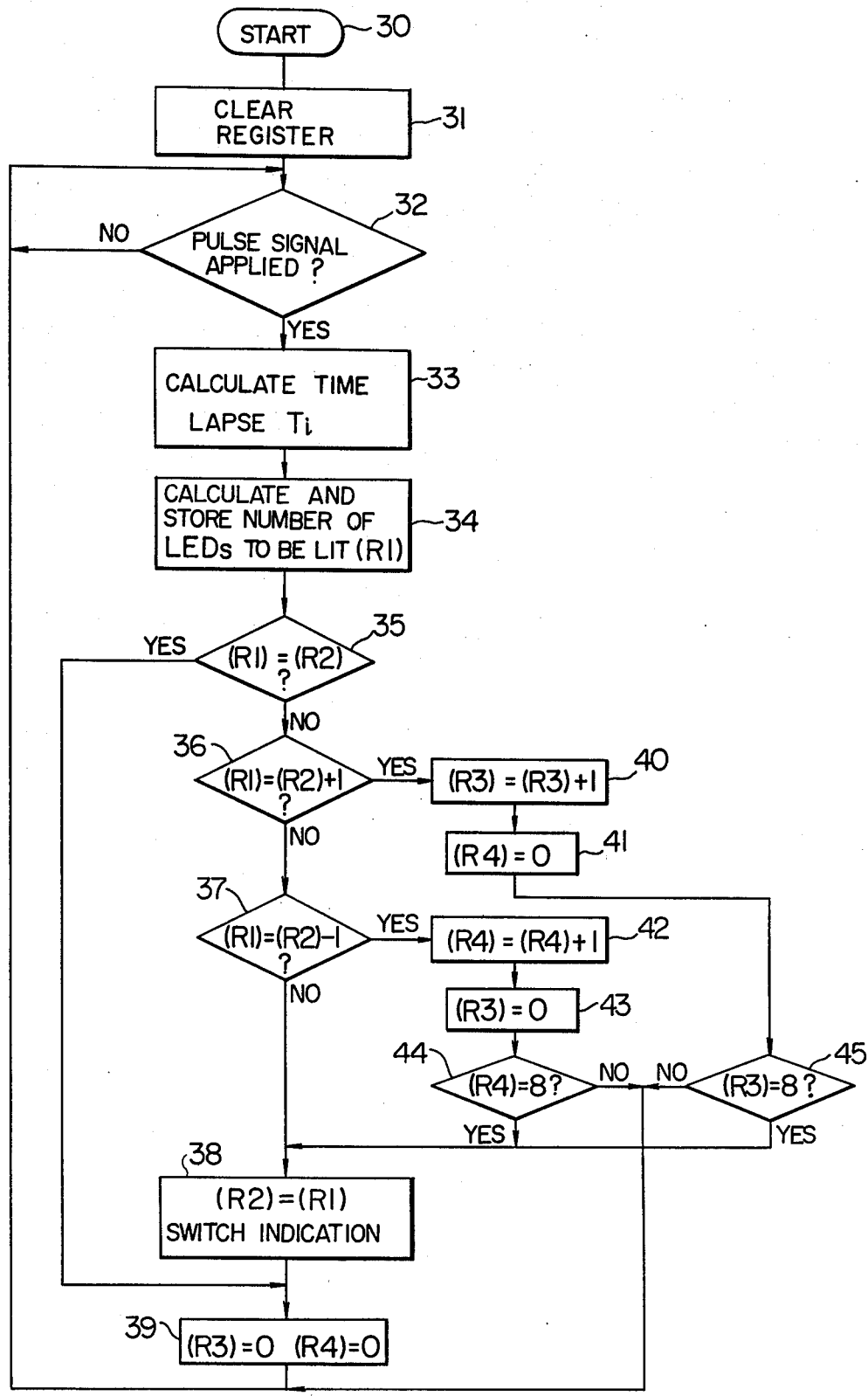

DISPLAY METHOD AND SYSTEM

BACKGROUND OF THE INVENTION

The present invention relates to an improved vehicle display method and system for displaying stepwise the state of indication items of the vehicle stepwise.

In recent years, the development of display elements such as light-emmiting diode (LED), the liquid crystal display (LCD) and the fluorescent light display tube (FLT), as well as the peripheral electronic circuit elements, has contributed to the improved visibility and response of indication. A number of display elements, for example, LED, LDC, and FLT have recently replaced conventional mechanical indicators in order to indicate such properties of an input signal as voltage and frequency (hereinafter referred to as the input signal) at multiple points.

Such a new method of display is of digital type, and therefore when the input signal is located at a critical point between a given point of indication and the next point of indication, the variation in the result of measurement based on the method of measurement of the input signal (for instance, in a frequency measurement, a variation of ±1 bit may result in the measured frequency due to the phase difference between the input signal and the counter or gate output signal) or the variation of the input signal itself undesirably intermittently indicates the next higher or lower point with respect to the present point, resulting in so-called "twinkling or flickering" to the discomfort of the viewer. This tires the viewer's eyes, thus making the indication system undesirable for automobile.

One of the methods conceived for eliminating such flickering is an integration method in which, in the case of frequency measurement, the time of measurement is lengthened to improve the accuracy on the one hand and to average out the variations of the frequency of the input signal on the other hand. In the measurement of voltage, an integration circuit is generally used to average out the input variations. These integration methods are effective for eliminating the flickering. Nevertheless, since they degrade the indicator response to the change of the input signal, these integration methods cannot be employed for an indication system in which the response is important.

SUMMARY OF THE INVENTION

The object of the present invention is to provide a display system in which, assuming that two points (points RA and LA) are adjacent to the present indication point (point A), and that an input signal is measured to indicate the point RA, the present indication is changed to the point RA only in the case where the same result of measurement continues during a predetermined number of measurement cycles or a predetermined length of time. This is also applicable to the measurement to indicate point LA. In this way, the "flickering" of the indication is eliminated, and in the event that an input signal is received for indication at a point other than the adjacent points to the present point, the present indication is changed to the point associated with the input signal from the next indication cycle, thereby improving the response of indication to the change of the input signal.

BRIEF DESCRIPTION OF THE DRAWINGS

FIG. 3 is a flowchart for explaining the operation of the microcomputer of FIG. 2.

DESCRIPTION OF THE PREFERRED EMBODIMENT

Figure 1:
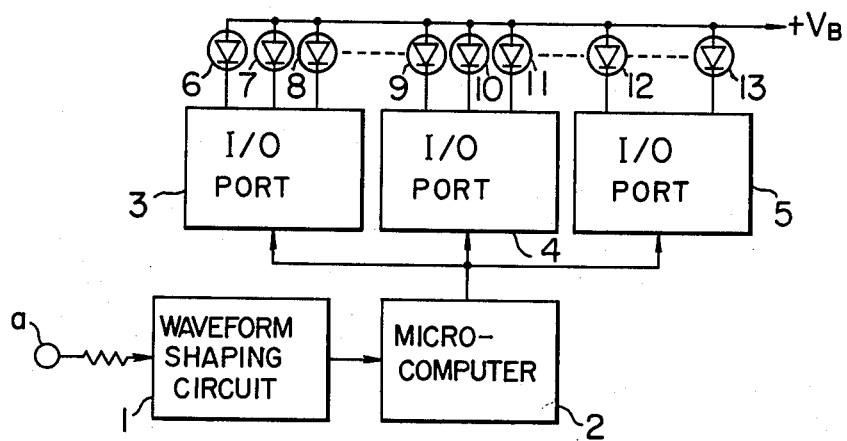
FIG. 1 is an electrical circuit diagram showing an embodiment of the present invention.

FIG. 1 is an electrical circuit diagram for an embodiment of the present invention showing the case in which the rotational speed of the automobile is displayed in a bar graph using multi-point defining LEDs.

An engine rotational speed signal in the form of an ignition pulse or a pulse signal synchronous with the ignition pulse is applied to a point a, and after being converted into a proper waveform at a waveform shaping circuit 1 including input processing, the converted signal is applied to a microcomputer 2. The output of the microcomputer 2 is applied to the I/O ports 3, 4 and 5 through a bus line thereby to light the LEDs of the number corresponding to the input signal frequency. Numerals 6 to 13 designate LEDs.

Figure 2:
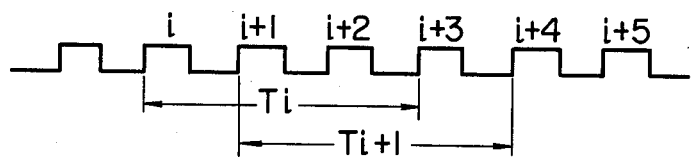
FIG. 2 shows an input waveform applied to a microcomputer shown in FIG. 1.

The microcomputer 2 measures the time interval Ti starting with a given pulse (such as i in FIG. 2), for example, ending with the third pulse i+3 among the input values as shown in FIG. 2 received from the waveform shaping circuit 1, thus determining the number of the LEDs to be lit. The LEDs in this number are not immediately lit, but through the next process, namely, a pretermined number of measurements including the next measurement of Ti+1, is performed under the conditions mentioned below, to determine the number of LEDs to be lit, which is followed by application of a signal to the I/O ports 3, 4 and 5 for indication.

Assume that the LEDs in the number of N have just been lit in FIG. 1. The number of the LEDs to be lit can be changed only when one of the three conditions described below is satified.

(1) After a specific number of times, e.g. eight times (herinafter referred to as a hysteresis number) of the above-mentioned measurements of a time interval starting with each of successive input signals, the LEDs in the number of N+1 must be determined to be lit only in the case where the respective measured results are to light the LEDs in the number of N+1 in all the eight measurements.

(2) After the measurements of the hysteresis number measuring a time interval starting with each of successive input signals, the LEDs in the number of N−1 must be lit only in the case where the respective measured results are to light the LEDs in the number N−1 in all the number of measurements.

(3) In the case where the measured result is to light the LEDs in the number other than N+1 or N−1, the LEDs in that particular number are lit immediately.

In this way, the number of LEDs presently lit is prevented from changing frequently between adjacent numbers on the one hand, and the indication is made to immediately follow a rapid change of input signal on the other hand.

The operation of the microcomputer 2 will be described with reference to the flowchart of FIG. 3.

When the operation starts, all the registers R1, R2, R3 and R4 contained in the microcomputer 2 are cleared to "0" (step 31). The register R1 is for storing the number of LEDs determined to be lit based on the latest pulse, the register R2 for storing the number of LEDs presently lit, the register R3 is a display switching counter for increasing the number of LEDs to be lit by one, and the register R4 is a display switching counter for decreasing the number of LEDs to be lit by one. After the initialization, the operational process is executed for lighting the LEDs on the basis of the pulse signals from the waveform shaping circuit 1. Assume that the LEDs of the number of N have just been lit by the operational process. If a pulse signal is applied to the microcomputer under this condition, the time interval Ti of the three pulses is counted and calculated as mentioned above (step 33). The reciprocal of this time interval Ti is proportional to the engine rpm so that by the use of this time interval, the number of LEDs to be lit representing the engine rotational speed is calculated, and the number of LEDs thus obtained is stored in the register R1 (step 34). The number of LEDs presently lit N stored in the register R2 is compared with the number of LEDs calculated above and stored in the register R1 (step 35). In the case where the numbers thus compared are the same N, the display is not changed. Through the steps 36 and 37 it is determined whether or not the calculated number of LEDs to be lit is other than N+1 or N−1. If the calculated number is not N+1 of N−1, the display is changed to indicate the calculated number of LEDs to be lit (step 38). In the case where the calculated number of the LEDs to be lit is N+1 (step 36), on the other hand, the value stored number of the register R3 is incremented by one (step 40), and when such an increment is successively made eight times in response to input signal pulses (steps 45), the display is switched to light the LEDs in the number of N+1 (step 38). In the case where the calculated number of LEDs to be lit is N−1 (step 37), the stored number of the register R4 is decremented by one, and when such a decrement is made eight times successively, the display is switched to light the LEDs in the number N−1.

Figure 4:
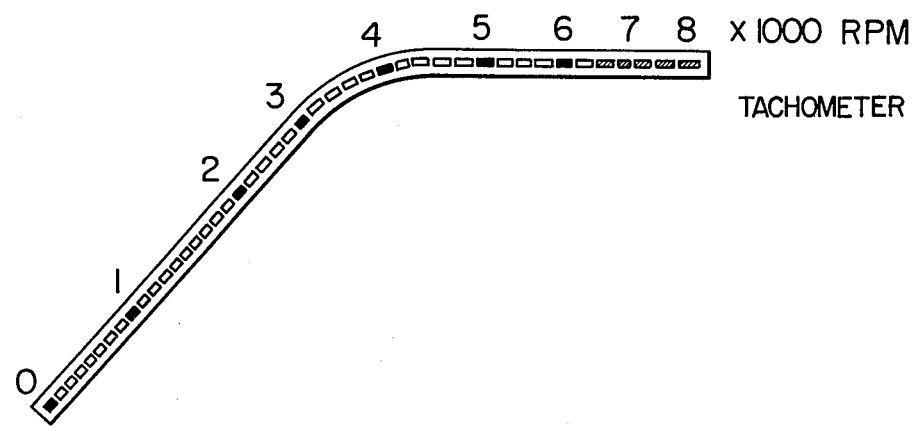
FIG. 4 shows an example of arrangement of the light-emmiting diodes.

Instead of the LEDs 6 to 13 used as the display elements in the above-mentioned embodiment, other display elements such as LCDs or FLTs may be used similarly for the purpose of display. Also, in place of the hysteresis number of eight, an increased number may be used to improve the stability against the flickering or a number less than eight may be used if it is desired to observe the minute change of the input signal earlier. Further, if the hysteresis number is changed with an appropriate engine rotational speed as a boundary point, the optimum stability and response for each rpm range may be obtained. For example, the hysteresis number may be changed to eight in the low speed region lower than 2000 rpm, and to three in the high speed region higher than 2000 rpm. Furthermore, without using the microcomputer 2, such hard logic circuit as a counter or a gate may be used with equal effect. What is more, although the display is lit in a bar graph in the above-mentioned embodiment, only the points corresponding to the forward ends of the bars may be lit for indication. Moreover, numerical display is possible in similar fashion. The diagram of FIG. 4 shows an example of arrangement of LEDs simulating an engine torque curve. In this diagram, numerals 0 to 8 designate representative rotational speeds of the engine, and the diodes between them are displayed in different colors.

Furthermore, apart from the engine tachometer which the above-mentioned embodiment concerns, the display may be stabilized by a similar method also in the case of indicating the readings of the automobile speedmeter in bar graph. The present in invention is also applicable with equal effect to indications on a fuel gauge or the like.

It will be understood from the foregoing description that according to the present invention, when an indication level adjacent to the present indication level is detected successively in a predetermined number of times, the present indication level is changed to the adjacent indication level. In the envent that an indication level other than the adjacent indication levels is detected, on the other hand, the present indication level is immediately changed to the detected indication level. In this way, the "twinkling" or "flicker" of the indication or display of the present indication point is prevented on the one hand and the response to the change in the detection signal is improved on the other hand.

We claim:

1. A method of detecting a condition of an indication device of a vehicle to stepwise indicate the detected result, said method comprising the steps of:
    first, discriminating whether a detected level of the detected condition from a detecting device corresponds to a currently-indicated level, and maintaining a current indication when the discrimination of said first step results in an affirmative discrimination;
    second, discriminating whether said detected level corresponds to an indcted level adjacent to said currently-indicated level;
    third, storing and updating the number of discriminating operations when the discrimination of said second step results in an affirmative discrimination;
    fourth, discirminating whether the updated number of discriminating operations reaches a predetermined number, and maintaining said current indication in said indicator device when the discrimination of said fourth step results in a negative discrimination;
    fifth, changing said current indication in said indication device to an indication corresponding to said adjacent indicated level when the discrimination of said fourth step results in an affirmative discrimination;
    sixth, changing said current indication in said indication device to an indication corresponding to said detected level when the discriminations of said first and second steps result in respective negative discriminations; and
    seventh, resetting said number of discriminating operations when the discrimination of said first step results in an affirmative discrimination, when the discrimination of said second step results in a negative discrimination or when the discrimination of said fourth step results in an affirmative discrimination.

2. In an indication system for a vehicle comprising means for detecting a condition level of an indication device of the vehicle and means for stepwise indicating the condition detected by said detecting means;
    circuit means comprising:
    first means for discriminating whether a detected level of condition corresponds to a currently-indicated level, and maintaining a current indication when the discrimination results in an affirmative discrimination;

second means for discriminating whether said detected level corresponds to an indicated level adjacent to said currently-indicated level;

third means for storing and updating the number of discriminating operations when the discrimination of said second means results in an affimative discrimination;

fourth means for discriminating whether the updated number of discriminating operations reaches a predetermined number, and maintained said current indication when the discrimination of said fourth means results in a negative discrimination;

fifth means for changing said current indication to an indication corresponding to said adjacent indicated level when the discrimination of said fourth means results in an affirmative discrimination;

sixth means for changing said current indication to an indication corresponding to said detected level when the discriminations of said first and second means result respective negative discriminations; and seventh means for resetting said number of discriminating operations when the discrimination of said first means results in an affirmative discrimination, when the discrimination of said second means results in a negative discrimination or when the discrimination of said fourth means results in an affirmative discrimination.

3. A system according to claim 2, wherein said detecting means comprises means for detecting engine rotational speed of the vehicle; and said indicating means comprises means for indicating the detected engine rotational speed in bar-graph format.

4. A system according to claim 3, wherein said detecting means generates signals repetitively in response to the engine rotaitonal speed, said repetitive signals being counted at intervals of a repetitive period established by a predetermined number to generate a respective counted-period indicating signal.

5. An indication system for a vehicle comprising:

means including a waveform shaping circuit for detecting a level of condition of an indication device of the vehicle and generating a waveform-shaped output signal of the detected level of condition;

indication means for stepwise indicating the detected condition; and microcomputer means comprising;

first means for discriminating whether the detected level of condition corresponds to a currently-indicated level and maintaining a current indication when the discrimination results in an affirmative discrimination;

second means for discriminating whether said detected level corresponds to an indicated level adjacent to said currently-indicated level;

third means for storing and updating the number of discriminating operations when the discrimination of said second means results in an affimative discrimination;

fourth means for discriminating whether the updated number of discriminating operations reaches a predetermined number, and maintaining said current indication when the discrimination of said fourth means results in a negative discrimination;

fifth means for changing said current indication to an indication corresponding to said adjacent indicated level when the discrimination of said fourth means results in an affirmative discrimination;

sixth means for changing said current indication to an indication corresponding to said detected level when the discriminations of said first and second means result in respective negative discriminations; and seventh means for resetting said number of discriminating operations when the discrimination of said first means results in an affimative discrimination, when the discrimination of said second means results in a negative discrimination or when the discrimination of said fourth means results in an affirmative discrimination.

* * * * *